(12) United States Patent
Kishigami et al.

(10) Patent No.: US 7,903,518 B2
(45) Date of Patent: Mar. 8, 2011

(54) OPTICAL RECORDING METHOD AND OPTICAL RECORDING DEVICE

(75) Inventors: Tomo Kishigami, Tokyo (JP); Osamu Tsukahara, Tokyo (JP); Yoshihiro Kiyose, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1072 days.

(21) Appl. No.: 11/587,697

(22) PCT Filed: Apr. 26, 2005

(86) PCT No.: PCT/JP2005/007876
§ 371 (c)(1),
(2), (4) Date: Oct. 26, 2006

(87) PCT Pub. No.: WO2005/109408
PCT Pub. Date: Nov. 17, 2005

(65) Prior Publication Data
US 2008/0062842 A1 Mar. 13, 2008

(30) Foreign Application Priority Data
May 10, 2004 (JP) ............................ 2004-139386

(51) Int. Cl.
*G11B 7/00* (2006.01)
(52) U.S. Cl. .................. 369/59.11; 369/59.12
(58) Field of Classification Search ............... 369/59.1, 369/59.11, 59.12
See application file for complete search history.

(56) References Cited

U.S. PATENT DOCUMENTS

| 6,631,110 B1 * | 10/2003 | Seo et al. ............... 369/59.12 |
| 7,068,579 B2 * | 6/2006 | Tasaka et al. ............ 369/59.24 |
| 2002/0021638 A1 | 2/2002 | Ohgake |
| 2002/0085470 A1 * | 7/2002 | Yokoi ....................... 369/59.11 |
| 2004/0037198 A1 | 2/2004 | Sasaki et al. |
| 2004/0136301 A1 * | 7/2004 | Ren et al. ................ 369/53.34 |
| 2004/0170101 A1 * | 9/2004 | Nakajo .................... 369/53.22 |
| 2006/0133237 A1 * | 6/2006 | Kishigami et al. ......... 369/47.5 |

FOREIGN PATENT DOCUMENTS

JP 11-296885 A 10/1999

(Continued)

*Primary Examiner* — Wayne R Young
*Assistant Examiner* — Aneeta Yodichkas
(74) *Attorney, Agent, or Firm* — Birch, Stewart, Kolasch & Birch, LLP.

(57) ABSTRACT

In a dye-type optical recording medium, a write strategy for use in recording is determined based on recommended write strategy parameters recorded on an optical disk (160) and the characteristics of the optical recording device, and recording is carried out on the optical disk (160) according to the determined write strategy. In a medium of the phase change type, a power ratio and modulation degree for use in recording are determined from a recommended pulse width value in the recommended write strategy parameters recorded in the optical disk (160), the recommended power ratio value, the recommended recording power value, and the characteristics of the optical recording device, and recording is carried out on the optical disk (160) according to the power ratio value and modulation degree value thus determined. Optimal recording can be carried out even on an optical disk for which the optimal write strategy information has not been determined in advance, without the need to store write strategy information suitable for each and every optical disk.

5 Claims, 13 Drawing Sheets

FOREIGN PATENT DOCUMENTS

| | | |
|---|---|---|
| JP | 2002-056531 A | 2/2002 |
| JP | 2002-183960 A | 6/2002 |
| JP | 2002-216350 A | 8/2002 |
| JP | 2002-237046 A | 8/2002 |
| JP | 2003-217123 A | 7/2003 |
| JP | 2003-331422 A | 11/2003 |
| JP | 2004-030707 A | 1/2004 |
| JP | 2004-303317 A | 10/2004 |

* cited by examiner

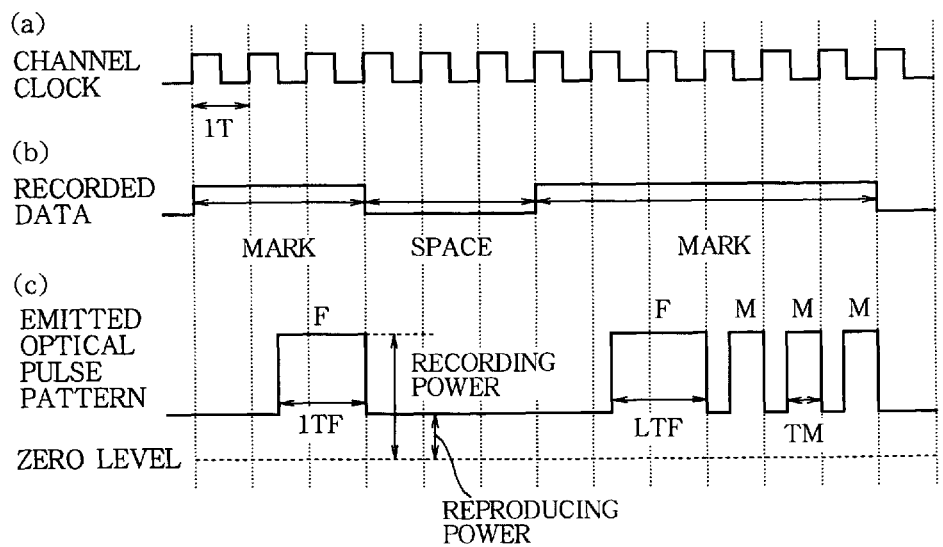
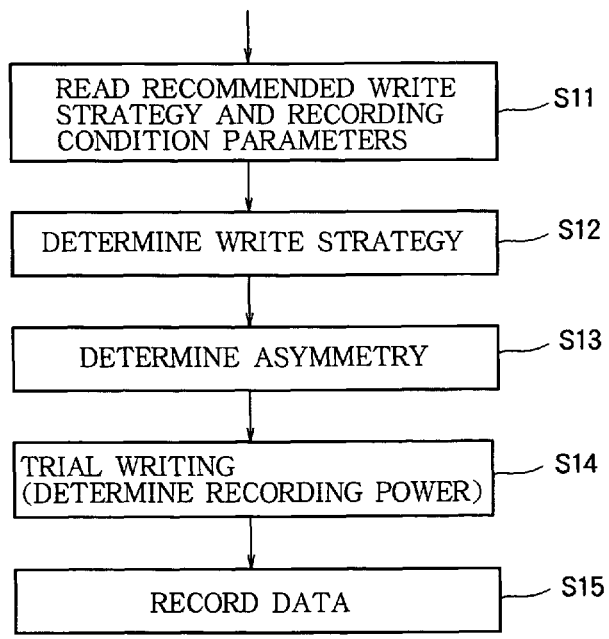

(a)
MODULATION DEGREE : SMALL (b)
MODULATION DEGREE : LARGE

OPTICAL RECORDING METHOD AND OPTICAL RECORDING DEVICE

FIELD OF THE INVENTION

The present invention relates to an optical recording method and an optical recording device for recording information on an optical recording medium, more particularly to a method of determining the write strategy to use in recording.

BACKGROUND ART

One example of a conventional optical recording device is a device having a recording and reproducing unit with a strategy section that controls the write strategy for writing to an optical disk, and a strategy information recording unit in which strategy information for operating the strategy section is recorded; strategy information corresponding to device information about the recording device and medium information about the optical disk is recorded in the strategy information recording section, read from the strategy information recording section, and transferred together with the medium information to the recording device. Default strategy information is also recorded in the strategy recording section in this device; if strategy information corresponding to the device information and medium information transferred from the recording device is not recorded on the storage information recording section, the default strategy information is read and transferred to the recording device (see, for example, Patent Document 1).

Patent Document 1: Japanese Patent Application Publication No. 2002-56531 (pp. 1-9, FIGS. 1-15)

DISCLOSURE OF THE INVENTION

Problems to be Solved by the Invention

In the above conventional optical recording device, as it is necessary to first investigate and then store in the optical recording device a large amount of strategy information corresponding to device information and medium information, much labor was required, and many storage devices such as memory devices were needed. Another problem has been that, since default strategy information is used when strategy information corresponding to the device information and medium information is not stored in the recording device, there are recording media that cannot be recorded on correctly because of mismatching recording conditions, depending on the optical conditions of the optical disk and the optical pickup.

The present invention addresses the above problems, a first object being to obtain an optical recording method and optical recording device that do not require the storage of all strategy information suitable for every optical disk and thus do not require storage devices of large capacity.

A second object is to obtain an optical recording method and optical recording device with which appropriate recording can be carried out even on an optical disk for which the optimal strategy information has not been determined in advance.

Means of Solution of the Problems

The present invention provides an optical recording method comprising the steps of:

reading recommended write strategy parameters from a dye-type optical recording medium on which the recommended write strategy parameters have been recorded;

determining the pulse widths of a write strategy for recording each mark, based on the recommended values of the leading pulse width and multi-pulse width in the write strategy for recording the shortest mark included in the recommended write strategy parameters that were read and characteristics of the optical system of the optical pickup of the optical recording device used in recording; and writing to the optical recording medium by use of the optical recording device, using the write strategy thus determined.

EFFECT OF THE INVENTION

According to the present invention, given the recommended write strategy parameters recorded on the optical recording medium, an appropriate write strategy responsive to the characteristics of the optical system of the optical pickup of the optical recording device used in recording can be determined, and recording can be carried out using the optimal write strategy.

A further effect is that it is not necessary to determine the appropriate write strategy for all optical recording media experimentally beforehand, so labor and cost can be saved, and a large-capacity memory is not required.

BRIEF DESCRIPTION OF THE DRAWINGS

FIG. 3 shows examples of write strategies generated in the optical recording device in the first embodiment of this invention when the optical disk is a medium of the dye type.

FIG. 4 is a flowchart illustrating the recording procedure in the optical recording device in a first embodiment of this invention.

EXPLANATION OF REFERENCE CHARACTERS

Figure 1:
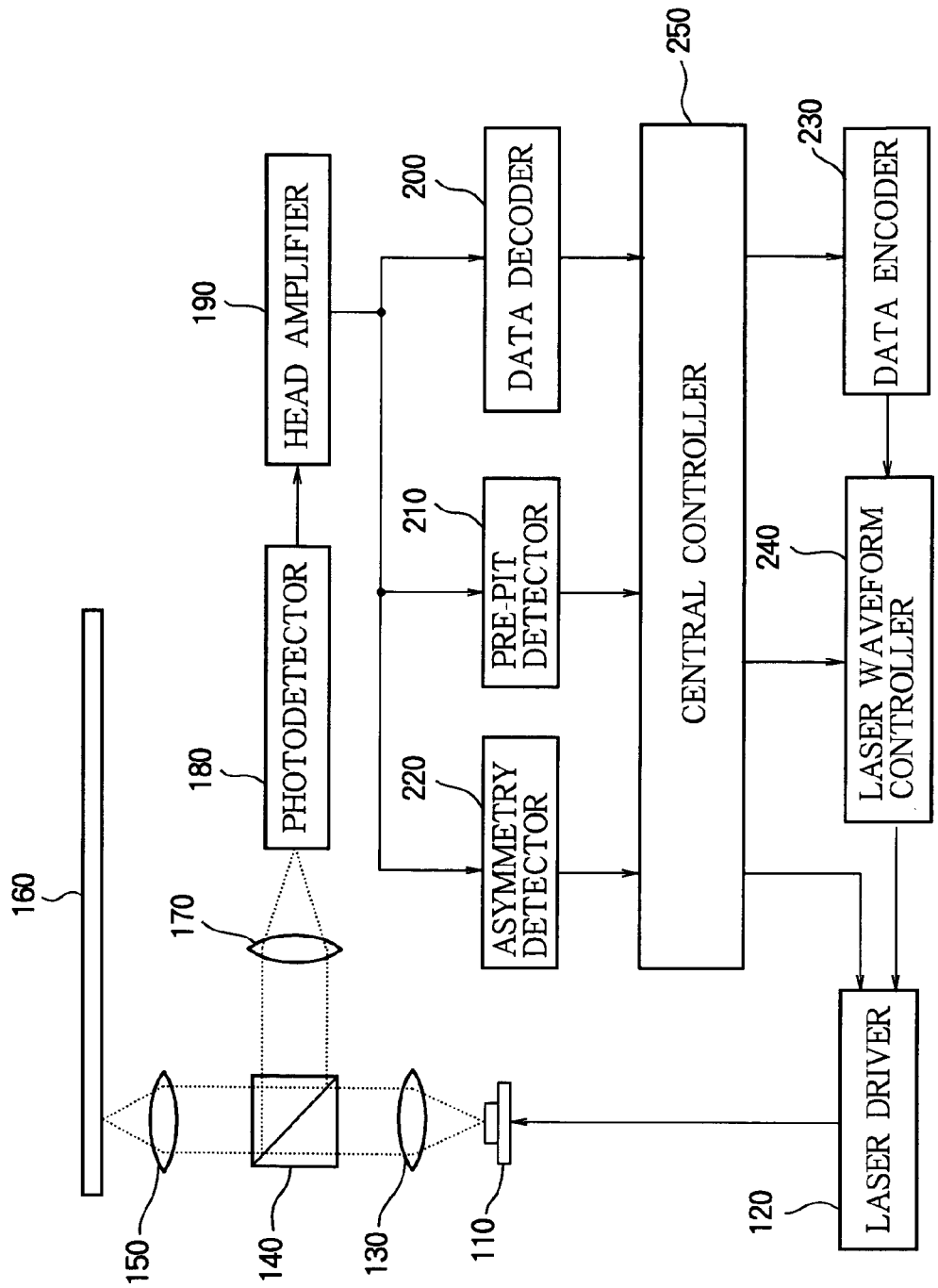
FIG. 1 is a block diagram showing an optical recording device in a first embodiment of this invention.

100 optical recording device, 110 semiconductor laser, 120 laser driver, 130 collimator lens, 140 beam splitter, 150 objective lens, 160 optical disk, 170 sensor lens, 180 photodetector, 190 head amplifier, 200 data decoder, 210 pre-pit detector, 220 asymmetry detector, 230 data encoder, 240 laser waveform controller, 250 central controller, 260 modulation degree detector

BEST MODE OF PRACTICING THE INVENTION

The recording method and recording device in the present invention record information on an optical disk on which recommended write strategy parameters or recommended recording conditions have been prerecorded. The recommended write strategy parameters or recommended recording conditions represent a write strategy or recommended recording conditions suitable for use in recording on the optical disk, and are recorded in the form of pre-pits, for example, in a predetermined area on the optical disk: the lead-in area, for example.

The optical disk includes, for example, a groove part (not shown) comprising grooves in which information is recorded, and a land part (not shown) between the grooves; the recommended write strategy parameters (including the recommended recording power) set by the recording media manufacturer are recorded in the land part together with other information such as an asymmetry value.

The recommended write strategy parameters envision that that recording will be performed under predefined conditions. For different recording conditions, therefore, it is preferable to use a write strategy different from the recommended write strategy parameters. According to the present invention, a write strategy is determined based on the recommended write strategy parameters or recommended recording conditions read from the optical disk, and on the characteristics of the optical system of the optical pickup of the optical recording device used in recording, and recording is performed by use of the write strategy thus determined.

First Embodiment

Embodiments of the invention will now be described with reference to the attached drawings.

The optical recording method in the embodiments below performs mark-edge recording (PWM recording). To record information, it causes a semiconductor laser to emit multiple pulses to form recording marks, based on the data to be recorded on the optical disk. In other words, the write strategy used in the following embodiments is a strategy of the multi-pulse type, having one or more pulses in the mark period. In the embodiments described below, in a write pulse strategy of this multi-pulse type, the pulse widths are changed responsive to the characteristics of the optical system of the optical pickup of the optical recording device.

In addition, in the embodiments described below, the recording of information onto the optical disk is carried out by illuminating the optical disk with optical pulses in patterns corresponding to the 3T to 11T and 14T marks (T being the channel clock period) in EFM modulation.

The longest mark (the mark with length 14T) is a sync pattern.

FIG. 1 shows an example of the basic structure of an optical recording device 100 according to the first embodiment of the invention. In FIG. 1, the semiconductor laser 110 used as a laser light source is driven and controlled by a laser driver 120.

When data are reproduced, a laser beam emitted from the semiconductor laser 110 with the output value (reproducing power) necessary for data reproduction is focused onto the optical disk 160 through a collimator lens 130, beam splitter 140, and objective lens 150. The light reflected from the optical disk 160 passes through the objective lens 150, is separated from the incident light by the beam splitter 140, and is then received through a sensor lens 170 by a photodetector 180.

In the above structure, the semiconductor laser 110, collimator lens 130, beam splitter 140, objective lens 150, and sensor lens 170 constitute the optical system, which in turn, together with the photodetector 180, constitutes the optical pickup.

The photodetector 180 converts the optical signal to an electric signal. The electric signal converted by the photodetector 180 is input through a head amplifier 190 into a data decoder 200, a pre-pit detector 210, and an asymmetry detector 220. The data decoder 200 generates (reproduces) the data recorded on the optical disk 160 by performing such processes as demodulation and error correction on the input electric signal.

From the input electric signal, the pre-pit detector 210 detects pre-pit information including such information as the recommended write strategy parameters, which are the recommended parameters of the write strategy to be used for recording on the optical disk 160.

The asymmetry detector 220 couples the input electrical signal by AC (alternating current) coupling and detects the peak level A1 and bottom level A2 of the AC-coupled electrical signal. Using the equation (1) below, it calculates an asymmetry value β from the detected peak level A1 and bottom level A2.

$$\beta=(A1+A2)/(A1-A2) \quad (1)$$

The peak level A1 and bottom level A2 occur in places where spaces of maximum length alternate with marks of maximum length; these values are expressed with a zero level equal to the average value of the peak level and bottom level in places where spaces of minimum length and marks of minimum length appear alternately.

Figure 2:
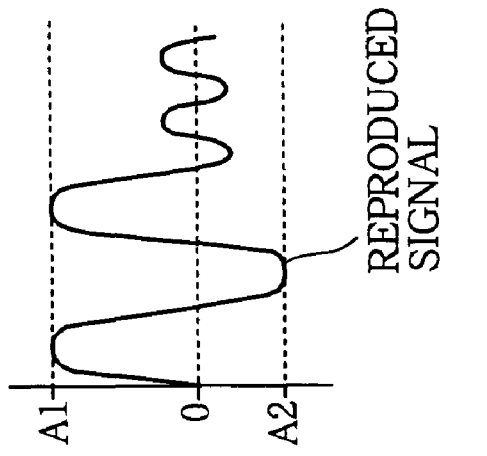
FIGS. 2 (a) to 2 (c) shows examples of asymmetry values of the reproduced signal detected in the asymmetry detector in the first embodiment of this invention.
Figure 2:
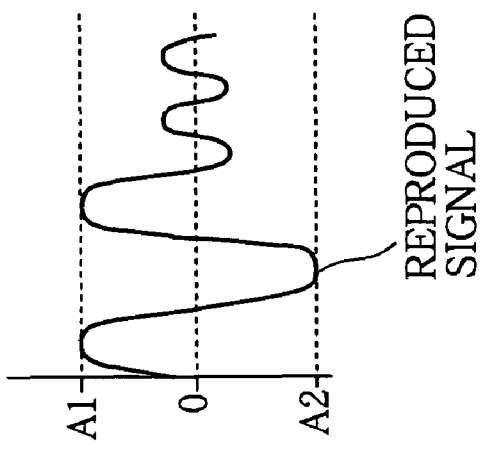
Figure 2:
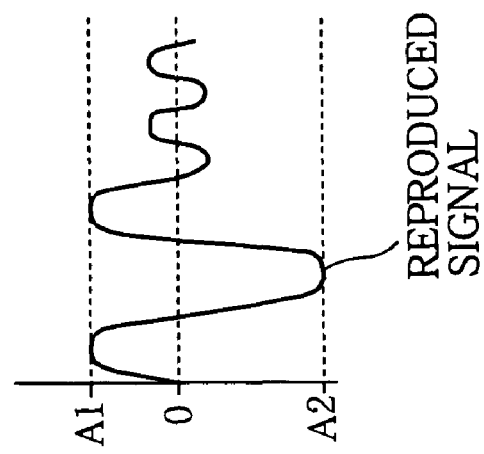

FIGS. 2 (a) to (c) show examples of the detection of the asymmetry value in the detected reproduced signal in the asymmetry detector 220. FIG. 2 (a) illustrates the case in which β<0. FIG. 2 (b) illustrates the case in which β=0. FIG. 2 (c) illustrates the case in which β>0.

In the recording of data, a data encoder 230 adds error correction symbols to the original data to be recorded and modulates the data to generate the recording data on which the driving signal to the semiconductor laser 110 is based. A laser waveform controller 240 generates a write strategy signal based on the recording data. When provided with recording data specifying one of 3T to 11T or 14T by a central controller 250, that is, the laser waveform controller 240 outputs a write strategy signal corresponding to the provided recording data (a signal having a waveform approximately matching the waveform of the emitted optical pulse train).

The laser driver 120 drives the semiconductor laser 110 with driving current responsive to the write strategy signal thus generated. A laser beam emitted from the semiconductor laser 110 with the output value (recording power) necessary for recording the data is focused onto the optical disk 160 through the collimator lens 130, beam splitter 140, and objective lens 150. The information is thereby recorded.

FIG. 3 shows an example of a write strategy generated in the laser waveform controller 240 in the optical recording and reproducing apparatus 100 shown in FIG. 1 when the optical disk 160 is a medium of the dye type. FIG. 3 (a) shows a channel clock having a period T. FIG. 3 (b) shows recording data comprising marks and spaces. FIG. 3 (c) shows the write strategy, i.e., the emitted optical pulse pattern, for recording the data in FIG. 3 (b). In the emitted optical pulse pattern, the level is changed between the recording power level and reproducing power level, and the width of each pulse is defined as the period spent at the recording power level.

The shortest mark has a length corresponding to 3T, while the longest mark has a length corresponding to 14T.

FIG. 3 (b) and FIG. 3 (c) show a case in which the shortest mark is recorded, then the fourth-shortest mark is recorded.

As shown at the left in FIG. 3 (c), when the recorded data are the shortest mark, the write strategy consists only of a leading pulse F having pulse width 1TF.

As shown at the right in FIG. 3 (c), the write strategy for recording the fourth shortest mark consists of a leading pulse F having pulse width LTF followed by three multi-pulses M.

The write strategy for recording the n-th shortest mark (4<n<10, having a length corresponding to ((n+2)T) consists of a leading pulse F having pulse width LTF, followed by (n−1) multi-pulses M.

The write strategy for recording the longest mark (a mark having length 14T) consists of a leading pulse F having pulse width LTF, followed by eleven multi-pulses M.

As shown, the marks from the fourth shortest mark to the longest mark have the same leading pulse width LTF.

The write strategy for recording the second shortest mark consists of a leading pulse F having pulse width 2TF, followed by one multi-pulse M.

The write strategy for recording the third shortest mark consists of a leading pulse having pulse width 3TF, followed by two multi-pulses M.

The width of the multi-pulses M is the same in all of the cases above.

During reproducing and writing operations by the semiconductor laser 110, the central controller 250 controls the device as a whole. The central controller 250 receives reproduced data from the data decoder 200, pre-pit information from the pre-pit detector 210, and an asymmetry value from the asymmetry detector 220, and provides control signals to the data encoder 230, the laser waveform controller 240, and the laser driver 120.

In particular, the central controller 250 controls the determination of the write strategy, especially the calculation of pulse widths and the asymmetry value, and trial writing performed by use of a modified write strategy and asymmetry value, as will be described later with reference to FIGS. 4 and 5.

The central controller 250 comprises, for example, a central processing unit (CPU), a program memory such as a read-only memory (ROM), for example, storing programs for the operation of the CPU, and a data memory such as a random-access memory (RAM), for example, for storing data. The program memory stores constants (Ki, Ci, etc.) for various calculations described later. The program stored in the program memory specifically includes a section defining equations for determining the write strategy and equations for determining the recording conditions, as described later with reference to FIGS. 4 and 5.

It is a general practice to optimize the recording power by performing trial writing before recording information. The procedure will be described below.

First, trial writing on the optical disk 160 is performed by use of a test pattern comprising 3T-11T spaces and marks corresponding to random recording data, for example, under varied recording power; next, the area on the optical disk 160 on which this test pattern has been recorded is reproduced, the asymmetry value is detected by the asymmetry detector 220, and the detected asymmetry value is compared with a target asymmetry value in the central controller 250 to obtain the optimal recording power.

In general, the higher the recording power, the higher the asymmetry value, and the lower the recording power, the lower the asymmetry value.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disk 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

Within this basic information recording method, in the present invention, the pulse widths in the write strategy used for recording and recording conditions such as the target value for adjusting the optimal power are obtained by calculations based on the recommended write strategy parameters and recommended recording conditions recorded on the optical disk 160 and the characteristics of the optical system of the optical pickup of the optical recording device used in recording; then the calculated pulse widths and recording conditions are used in recording.

Next, the procedure followed in the optical recording method of this embodiment will be described with reference to FIG. 4.

First, when the optical disk to be used in recording is inserted in the optical recording device, in step S11, the recommended write strategy and recording condition parameters, i.e., the recommended values iTP (i=1, 2, 3, L) of the leading pulse width in the write strategy for recording each mark, the recommended value TMP of the multi-pulse width in the write strategy, and the recommended asymmetry value β1 are read (step S11).

The recommended write strategy parameters include the recommended value of the leading pulse width in the write strategy for recording each mark. As the recommended values iTP of the leading pulse width, at least the following values are read:

a recommended pulse width 1TP of the leading pulse F for recording the shortest mark;

a recommended pulse width 2TP of the leading pulse F for recording the second shortest mark; and a recommended pulse width LTP of the leading pulse F for recording marks from the fourth shortest mark to the longest mark.

The recommended asymmetry value β1 is the target value used to determine the recording power in trial writing.

Next, in step S12, the write strategy to be used in recording is determined based on the recommended write strategy parameters that were read and the characteristics of the optical system of the optical pickup of the optical recording device used in recording (step S12). Details will be given later.

Next, in step S13, the asymmetry value β2 to be used in recording is calculated according to the following equation (2), based on the numerical aperture NA1 used for determining the recommended write strategy parameter and the recommended asymmetry value β1 that were read in step S11 as described above, and the numerical aperture NA2 of the objective lens 150 of the optical recording device 100 used in recording (step S13).

$$\beta2=\beta1+E\times(NA2-NA1) \quad (2)$$

The numerical aperture NA1 is known; data representing the numerical aperture NA1 are prestored in a non-volatile memory (comprising ROM, for example) in the central controller 250. Data representing the numerical aperture NA2 of the objective lens 150, and the constant E have also been stored in the non-volatile memory in the central controller 250; these data are read and used for the calculation according to equation (2).

Next, when a recording command is received, trial writing on the optical recording medium is performed in step S14, using the write strategy parameters and asymmetry value obtained as above. That is, the write strategy determined in step S12 is set in the laser waveform controller 240, which in turn generates write strategies based on the test pattern to perform trial writing to the optical disk 160. The asymmetry value β2 obtained as above is used as a target value. That is, the optimal recording power is determined by reproducing the area on the optical disk 160 on which the test pattern has been recorded, comparing the asymmetry value detected by the asymmetry detector 220 with the asymmetry value β2 calculated in step S13, and performing control to make the two values match.

Then, after this trial writing has been performed and the power has been adjusted, the adjusted recording power and the write strategy obtained in step S12 are used in step S15 to record data. That is, the write strategy determined in step S12 is set in the laser waveform controller 240, which in turn, generates write strategies based on the recording data, and performs writing onto the optical disk 160 with the recording power determined in step S14.

Once the write strategy determined in step S12 has been set in the laser waveform controller 240 in FIG. 1, when the central controller 250 specifies one of 3T to 11T or 14T, a write strategy signal corresponding to the specified value is output from laser waveform controller 240.

Figure 5:
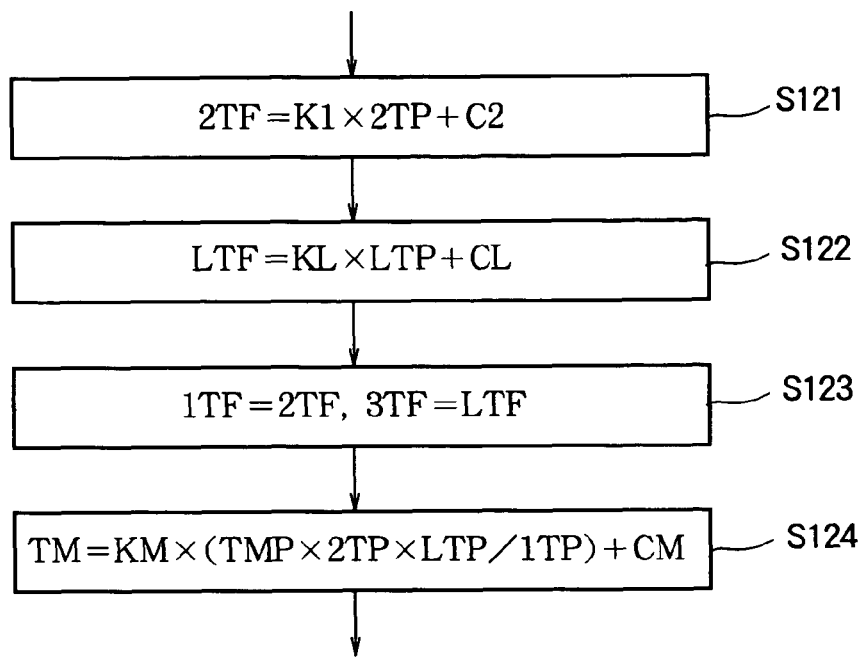
FIG. 5 is a flowchart for calculating the write strategy from recommended write strategy parameters recorded on an optical disk in the optical recording device in the first embodiment of this invention.

FIG. 5 shows the determination process in step S12 in FIG. 4 in more detail.

In step S121, the pulse width 2TF of the leading pulse F for recording the second shortest mark is calculated from the recommended pulse width 2TP obtained in step S11 and constants K2 and C2, by use of the following equation (3).

$$2TF=K2\times 2TP+C2 \quad (3)$$

In step S122, the pulse width LTF of the leading pulse F for recording the marks from the fourth shortest mark to the longest mark is calculated from the recommended pulse width LTP obtained in step S11 and constants KL and CL, by use of the following equation (4).

$$LTF=KL\times LTP+CL \quad (4)$$

In step S123, the value of the pulse width 2TF calculated in step S121 is set as the pulse width 1TF of the leading pulse F for recording the shortest mark.

The value of the pulse width LTF calculated in step S122 is set as the pulse width 3TF of the leading pulse F for recording the third shortest mark.

In step S124, the pulse width TM of the multi-pulses M is calculated from the recommended pulse widths 1TP, 2TP, LTP, and TMP obtained in step S11 and constants KM and CM, by use of the following equation (5).

$$TM=KM\times(TMP\times 2TP\times LTP/1TP)+CM \quad (5)$$

The data representing the constants K2, KL, KM, C2, CL, and CM used in the above steps S121 to S124 are stored in the non-volatile memory in the central controller 250. These data are read out for use in the calculations according to equations (3), (4), and (5).

As stated above, in step S12 the leading pulse widths and multi-pulse width in the write strategy used in recording are determined from the leading pulse widths and multi-pulse width in the recommended write strategy parameters read from the optical disk. In other words, the recommended write strategy parameters are not used as is, but are modified. The reason is as follows.

The recommended write strategy parameters, recommended asymmetry value, etc. are recorded in a predetermined area on the optical disk as described above, but when the numerical aperture NA1 of the objective lens 150 under the recording conditions when the recommended write strategy parameters were recorded on the optical disk 160 differs from the numerical aperture NA2 of the objective lens 150 of the optical recording device 100 used in recording, if the power is determined by using the recorded recommended write strategy parameters and asymmetry value, the amount of heat supplied to the optical disk 160 and its distribution differ due to the difference in the numerical aperture. Therefore, the size and shape of the pits formed corresponding to each mark length are other than optimal, and jitter is worsened. The write strategy is therefore modified or optimized to compensate for the difference in recording conditions, particularly for the difference in numerical apertures.

The asymmetry value β2 used in recording is calculated in the above step S13 based on the recommended asymmetry value β1 read from the optical disk. In other words, the asymmetry value β1 recorded on the optical disk is modified before being used. The reason for this is as follows.

The above difference in the numerical apertures causes a difference in the detected asymmetry value. For example, when NA1<NA2, i.e., the numerical aperture NA2 of the objective lens 150 of the optical recording device 100 used in recording is greater than the numerical aperture NA1 of the objective lens in the recording conditions under which the recommended asymmetry value was recorded on the optical disk 160, the asymmetry value detected with an objective lens having numerical aperture NA2 has a larger value than the asymmetry value detected with an objective lens having numerical aperture NA1. Therefore, if recording is performed with an objective lens having a numerical aperture NA2 with a target value equal to the recommended asymmetry value β1, the detected asymmetry value will have a higher value than the actual value, due to the difference in the numerical aperture, and recording will be performed with an asymmetry value smaller than the recommended asymmetry value β1. Therefore, when recording is performed with an objective lens having a numerical aperture NA2, the target is preferably set to a higher value than the recommended asymmetry value β1.

Next, the above procedure will be described in detail. First, the optimization of the write strategy will be described. It would be preferable if the optimization correction could be performed by a mathematical equation, but it was not clear what equation to use.

Therefore, the inventors conducted a variety of experiments to find conditions with minimum reproducing jitter, when the recording conditions of the optical recording device used in recording differ from the recording conditions used in determining the recommended write strategy parameters.

As a result, a linear relationship was found between the leading pulse width iTF (i=2 or L) that minimizes reproducing jitter (the pulse width that minimizes reproducing jitter may also be referred to as the optimal pulse width or optimal value of the pulse width) and the recommended pulse width parameter iTP (i=2 or L); from a regression analysis conducted on the data obtained in the experiment, it was found that this relationship could be approximated by lines represented by equations (3) and (4).

It was also found that the optimal value 1TF of the leading pulse width in the write strategy for recording the shortest mark was equal to the optimal value 2TF of the leading pulse width in the write strategy for recording the second shortest mark, and that the optimal value 3TF of the leading pulse width in the write strategy for recording the third shortest mark was equal to the optimal value LTF of the leading pulse width in the write strategy for recording the marks from the fourth shortest mark to the longest mark.

It was further found that the optimal value TM of the multi-pulse width was linearly related to the value TMP× 2TP×LTP/1TP calculated from the recommended pulse widths.

Figure 6:
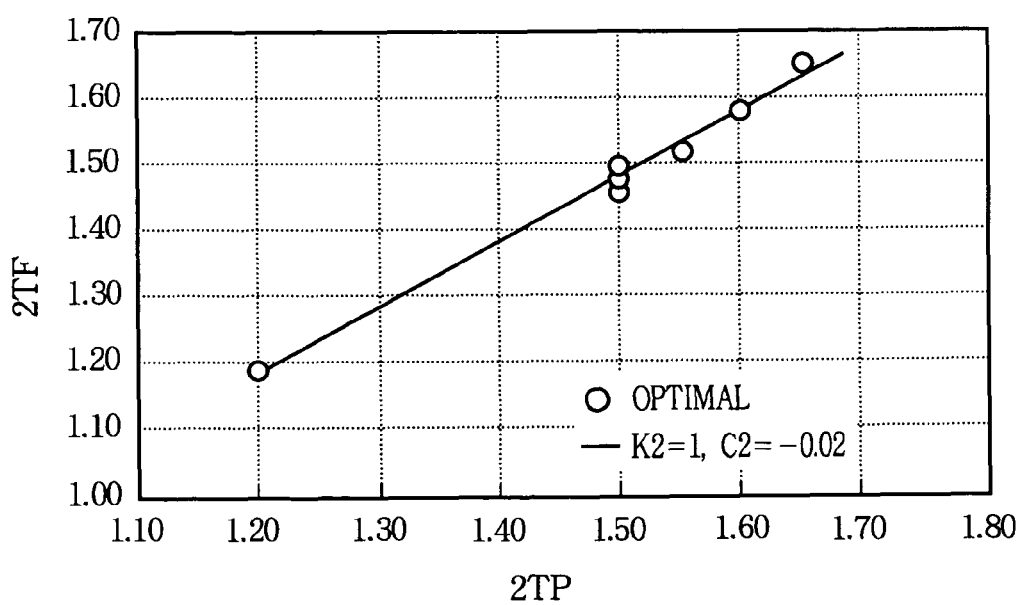
FIG. 6 illustrates the relationship between a pulse width 2TF and a recommended write strategy parameter 2TP in the optical recording device in the first embodiment of this invention.

FIG. 6 shows circles representing the value of the leading pulse width 2TF in the write strategy with minimum reproducing jitter, and a line indicating the leading pulse width 2TF in the write strategy obtained when K2=1 and C2=−0.02 in equation (3). As can be seen in the drawings, the deviation of the optimal values from the approximation line (the approximation error) is small.

Figure 7:
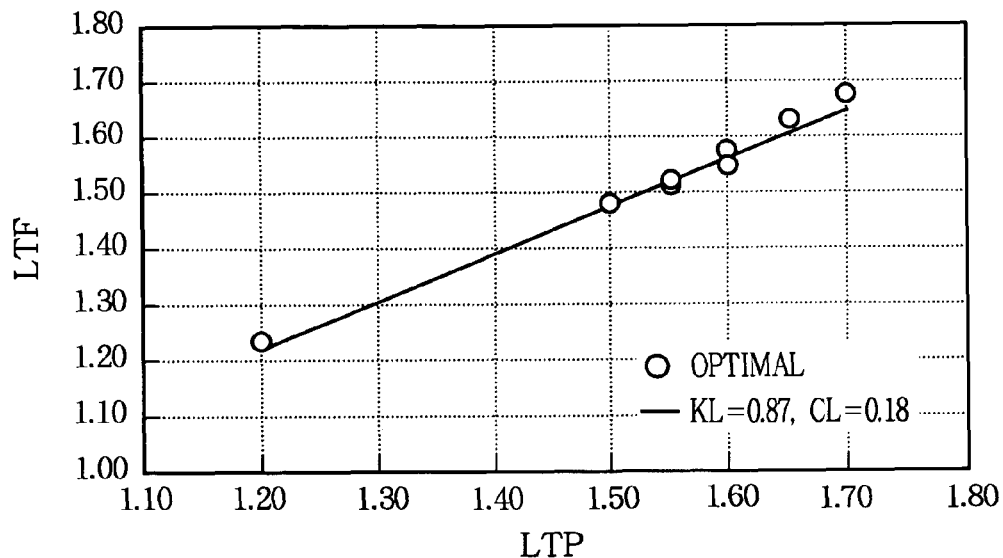
FIG. 7 illustrates the relationship between a pulse width LTF and a recommended write strategy parameter LTP in the optical recording device in the first embodiment of this invention.

FIG. 7 shows circles representing the value of the leading pulse width LTF in the write strategy with minimum reproducing jitter, and a line indicating the leading pulse width LTF in the write strategy obtained when KL=0.87 and CL=0.18 in equation (4). As can be seen in the drawings, the deviation of the optimal values from the approximation line (the approximation error) is small.

Figure 8:
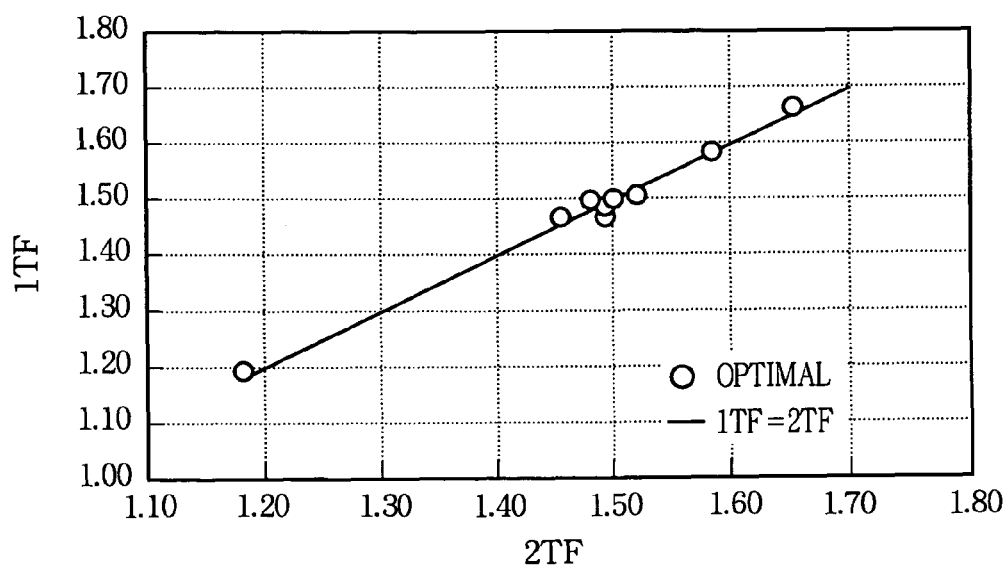
FIG. 8 illustrates the relationship between pulse widths 1TF and 2TF in the write strategy in the optical recording device in the first embodiment of this invention.

FIG. 8 shows circles representing the value of the leading pulse width 1TF in the write strategy with minimum reproducing jitter, and a line indicating the leading pulse width 1TF in the write strategy obtained when 1TF=2TF. It can be seen that 1TF and 2TF are almost the same.

Figure 9:
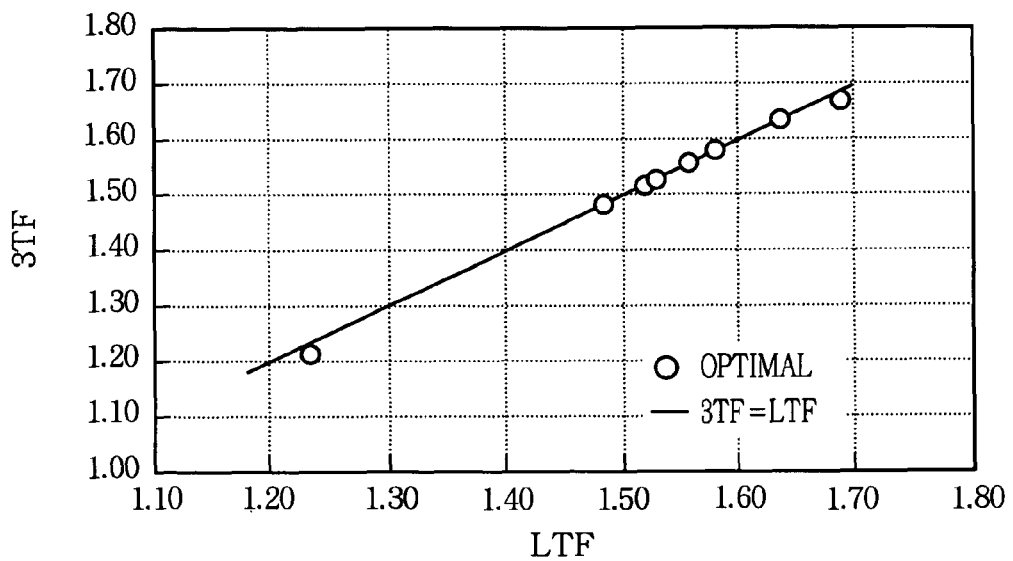
FIG. 9 illustrates the relationship between pulse widths 1TF and 3TF in the write strategy in the optical recording device in the first embodiment of this invention.

FIG. 9 shows circles representing the value of the leading pulse width 3TF in the write strategy with minimum reproducing jitter, and a line indicating the leading pulse width 3TF in the write strategy obtained when 3TF=LTF. It can be seen that 3TF and LTF are almost the same.

Figure 10:
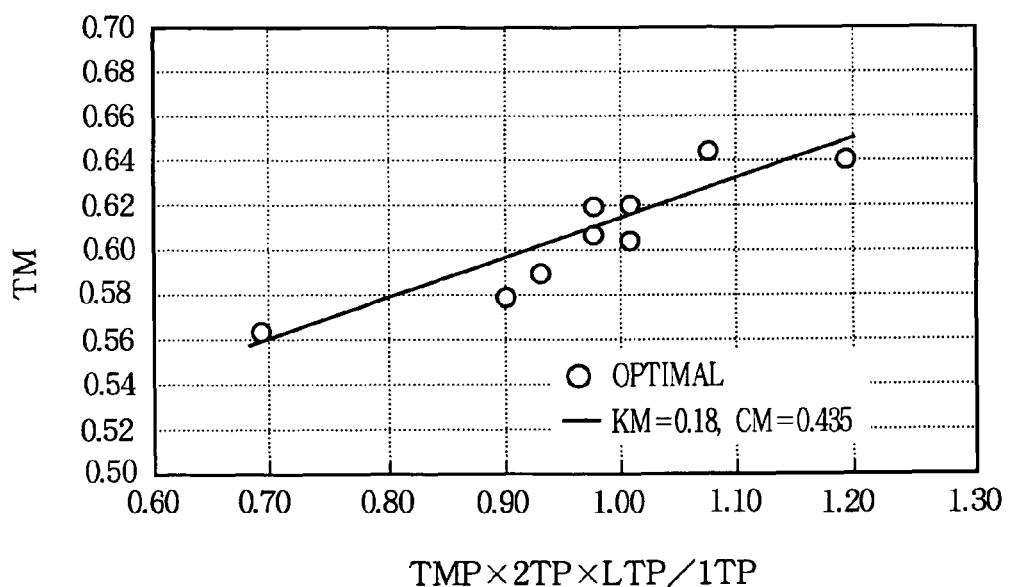
FIG. 10 illustrates the relationship between the pulse width TM and the recommended write strategy value TMP×2TP× LTP/1TP in the optical recording device in the first embodiment.

FIG. 10 shows circles representing the value of the multi-pulse width TM in the write strategy with minimum reproducing jitter, and a line indicating the multi-pulse width TM in the write strategy obtained when KM=0.18 and CM=0.435 in equation (5). As can be seen in the drawings, the deviation of the optimal values from the approximation line (the approximation error) is small.

The conditions that were used in carrying out the experiments that gave the results shown in FIGS. 6 to 10 were as the following. The numerical aperture NA1 of the objective lens in the recording conditions under which the recommended write strategy parameters were recorded on the optical disk 160 was 0.60; the numerical aperture NA2 of the objective lens 150 in the optical recording device 100 used in the experiments was 0.64.

As described above, for a particular optical recording device, it was found that favorable results could be obtained when the constants are set as above.

Next, the modification of the asymmetry value will be described.

As noted above, the optimal asymmetry value is affected by the numerical aperture of the optical recording device used in recording, so when the numerical aperture of the optical recording device differs from the numerical aperture in the recording conditions under which the recommended write strategy was determined, the numerical aperture should be taken into account in determining the asymmetry value to be used in recording. In this embodiment, a correction determined from the difference between the numerical apertures is added to the recommended asymmetry value β1 to obtain an asymmetry value β2 to be used in recording. Specifically, it was found appropriate to use the above equation (2).

$$\beta2=\beta1+E\times(NA2-NA1) \quad (2)$$

This is the reason why equation (2) is used in step S13 in FIG. 4.

Figure 11:
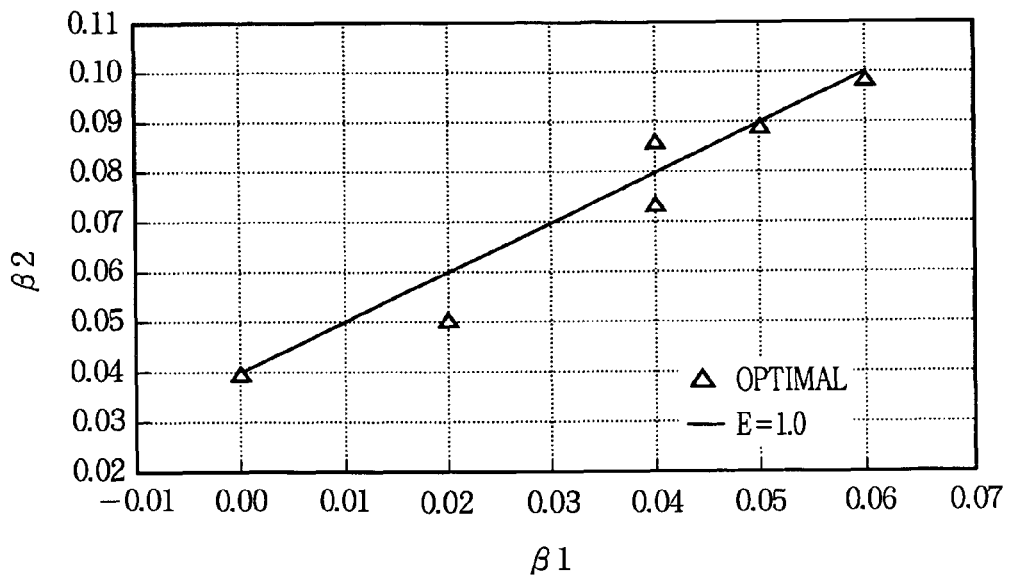
FIG. 11 illustrates the relationship between an asymmetry value β1 recorded on the optical disk and an asymmetry value β2 used in recording in the first embodiment of this invention.

The triangles in FIG. 11 indicate the values of the asymmetry value β2 that minimize the reproducing jitter in a certain optical recording device 100 for a plurality of optical disks having mutually differing recommended asymmetry value β1, and the straight line indicates the asymmetry value β2 obtained from equation (2) with E=1.0. As shown in FIG. 11, it was found that the asymmetry values (optimal asymmetry values) that minimize the reproducing jitter could be linearly approximated by use of equation (2).

As described above, it was found that for a certain optical recording device, good results are obtained if the value of constant E is set as above.

Figure 12:
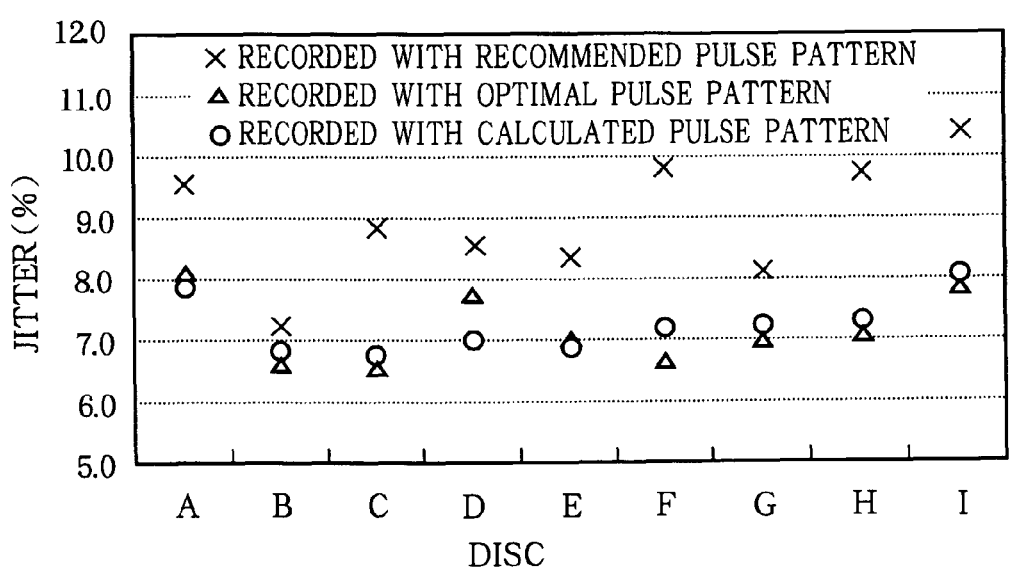
FIG. 12 illustrates the relationship between jitter value and the write strategy used in recording in the optical recording device in the first embodiment of this invention.

FIG. 12 shows reproducing jitter when three pulse patterns were used for recording on each of nine types of optical disks A to I.

The X marks in FIG. 12 indicate the reproducing jitter when recording was performed using the recommended write strategy parameters recorded on each optical disk.

The triangular marks indicate the reproducing jitter when recording was performed using the optimized write strategy adjusted so as to obtain optimal reproducing jitter for each optical disk.

The circles indicate the reproducing jitter when recording was performed using the write strategy modified according to the above equations (3), (4), and (5).

The constants in equations (3), (4), and (5) in this case were set as follows: K2=1, C2=−0.02, KL=0.87, CL=0.18, KM=0.18, CM=0.435, E=1.0.

In FIG. 12, better reproducing jitter could be obtained on all the disks when recording was performed using the modified recommended write strategy parameters (as indicated by the circles) than when recording was performed using the recommended write strategy parameters recorded on each optical disk (as indicated by the X's). When recording was performed using the modified write strategy (as indicated by the circles), it was possible to obtain nearly the same good reproducing jitter as when recording was performed using the optimal write strategy (as indicated by the triangles).

Thus according to the present embodiment, recording can be performed using optimal write strategies and asymmetry values responsive to the characteristics of the optical system of the optical pickup of the optical recording device.

For example, the optical system conditions such as the numerical aperture etc. used in determining the recommended parameters recorded on an optical recording medium generally differ from the optical conditions of commercially available optical recording devices, but by taking account of the differences between the specifications of a commercially available optical recording device, particularly the specifications of the optical system of its optical pickup, and the specifications of the optical system used in determining the recommended parameters, it is possible to determine write strategy parameters and asymmetry values suitable for each optical recording device, and to perform recording with write strategies best suitable for each optical recording device.

The write strategies and asymmetry values suitable for each recording device can be calculated easily if attention is paid to the differences between optical recording devices, particularly differences in the characteristics of the optical systems of their optical pickups, more particularly optical system differences including the numerical apertures of their objective lenses, by experimentally determining the constants (K2, KL, KM, C2, CL, CM, E) of the equations used to determine the write strategies and asymmetry values, storing these constants in the optical recording device, in non-volatile memory in the central controller 250, for example, and reading out and using these stored constants in recording.

The constants only need to be determined once for each type of optical recording device or set of specifications; the same constants can be applied to other optical recording devices of the same type or with the same specifications. Once constants have been determined for an optical recording device of a certain type or with certain specifications, other optical recording devices of the same type or with the same specifications can be shipped with the constants that have been determined set therein.

When the type or specifications of the optical recording device 100 are changed, the strategy conditions can be optimized easily by selecting or determining the constants (K2, KL, KM, C2, CL, CM, E) in equations (3), (4), and (5) again.

In the optical recording method according to the first embodiment, because the recommended write strategy parameters and the recommended asymmetry value recorded on the optical disk 160 are calculated using equations (3), (4), and (5), it is possible to support recording by any recording device on any recording medium without the need to store a large amount of strategy information.

Recording can furthermore be performed better than when the recommended write strategy parameters and recommended asymmetry value are used without modification, and nearly as well as when the optimal recommended write strategy parameters for each optical disk are used. Good recording accordingly can be performed on an optical disk for which the optimal write strategy information is not known beforehand.

In the above embodiment, the pulse width 1TF of the leading pulse F for recording the shortest mark is set equal to the pulse width of the leading pulse F for recording the second shortest mark, and the pulse width 3TF of the leading pulse F for recording the third shortest mark is set equal to the pulse width LTF of the leading pulse F for recording the fourth shortest mark to the longest mark, but the pulse widths of the leading pulse F may be given different values in each of these cases.

That is, the pulse widths, such as in equations (3) and (4), can be generalized as follows.

$$LTi = Ki \times LTP + Ci$$

Second Embodiment

A recording method when the optical disk 160 is a dye-type recording medium is described in the first embodiment above. The following will describe a recording method when the optical disk 160 is a recording medium of the phase change type and, further, when recording is carried out at the standard recording speed.

Figure 13:
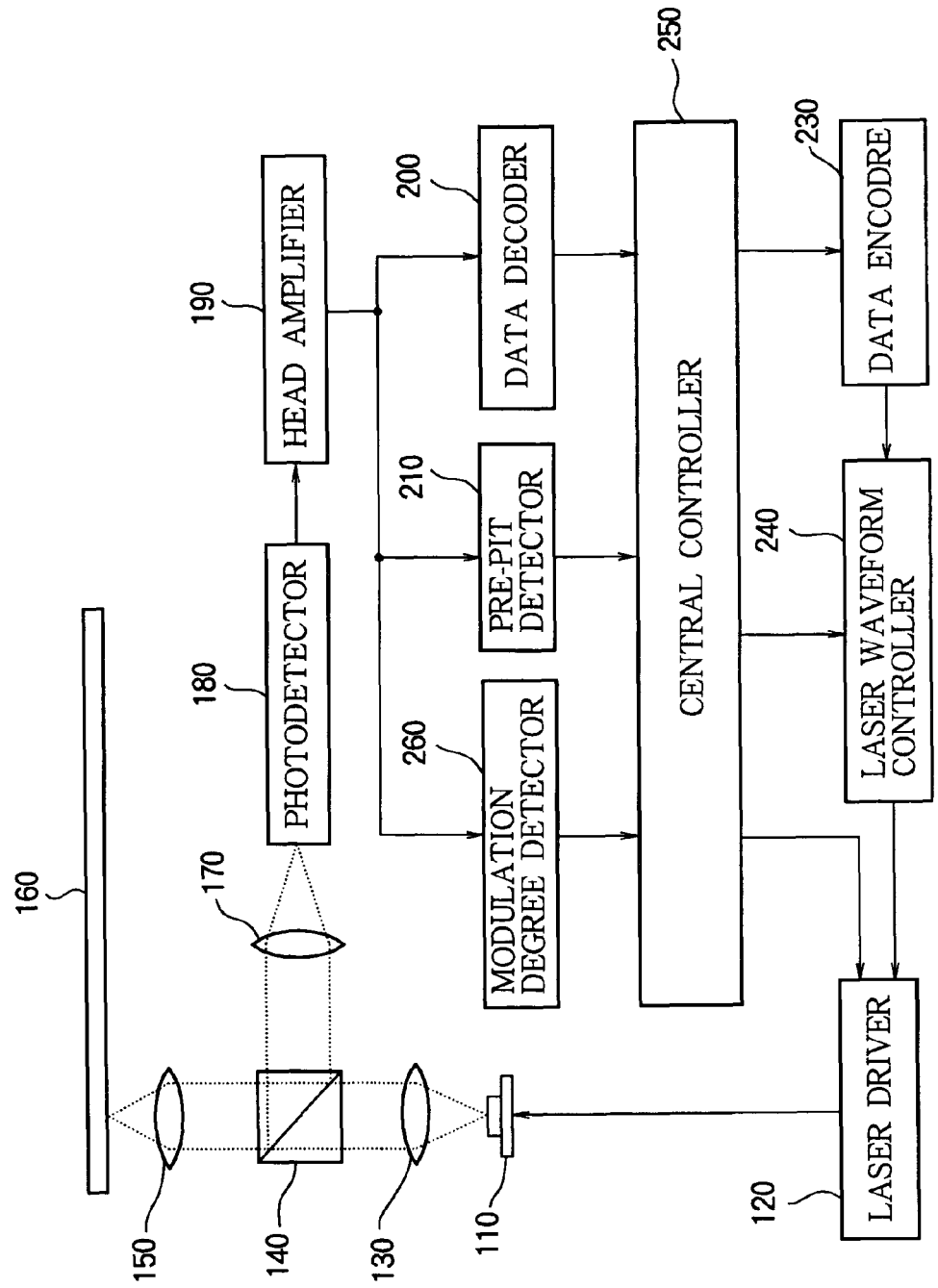
FIG. 13 is a block diagram showing an optical recording device in a second embodiment of this invention.

FIG. 13 shows an example of the basic structure of an optical recording device 100 according to the second embodiment of the invention. The optical recording device 100 shown in FIG. 13 is generally the same as the optical recording device in FIG. 1, except that it does not have the asymmetry detector 220 in FIG. 1 and instead has a modulation degree detector 260. The central controller 250 receives a modulation degree value from the modulation degree detector 260 (instead of receiving an asymmetry value from the asymmetry detector 220), performs a calculation on the modulation degree instead of a calculation on an asymmetry value, and controls trial writing by using the modified write strategy and modified modulation degree, instead of using a modified write strategy and an asymmetry value.

The modulation detector 260 detects the peak level B1 and the bottom level B2 of an input electrical signal. Using the equation (6) below, it calculates a modulation degree value MOD from the detected peak level B1 and bottom level B2.

$$MOD = (B1 - B2)/B1 \qquad (6)$$

The peak level B1 and bottom level B2 occur in places where spaces of maximum length alternate with marks of maximum length; these values expressed with the output level of the photodetector 180 when there is no incident light as the zero level.

Figure 14:
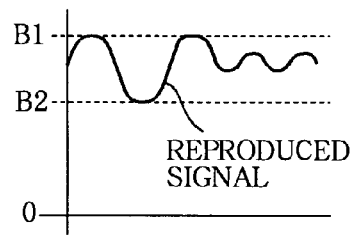
FIGS. 14 (*a*) and 14 (*b*) shows examples of modulation degrees of the reproduced signal detected in the modulation degree detector in the second embodiment of this invention.
Figure 14:
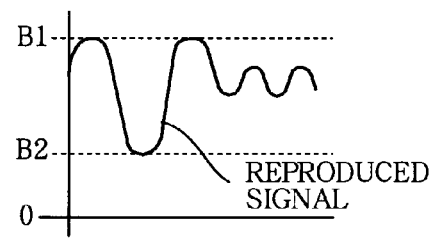

FIGS. 14 (*a*) and 14 (*b*) show examples of modulation degrees of the reproduced signal detected in the modulation degree detector 260. FIG. 14 (*a*) shows an example with a comparatively small modulation degree. FIG. 14 (*b*) shows an example with a larger modulation degree.

Figure 15:
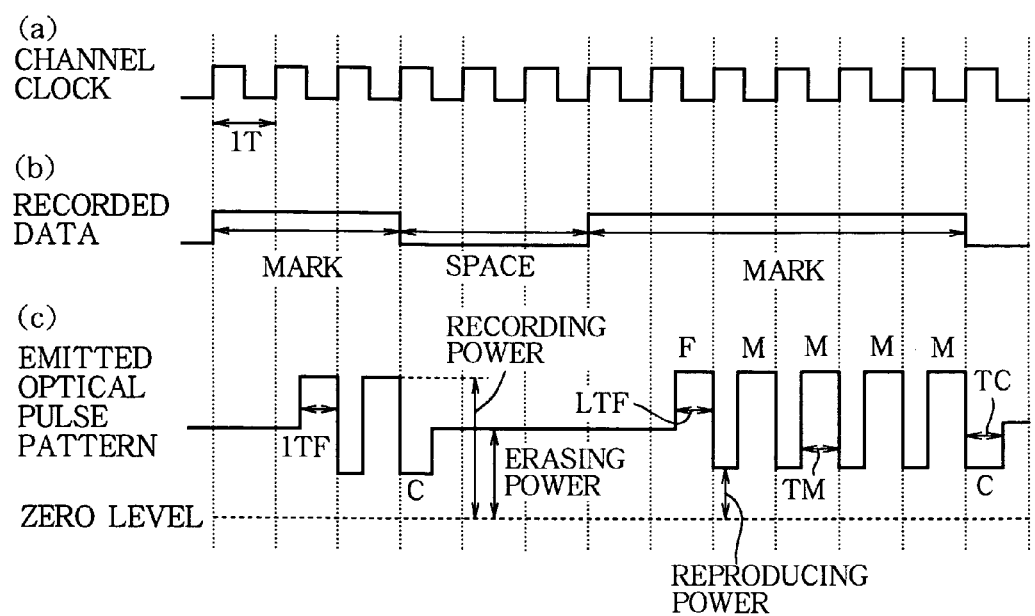
FIG. 15 shows examples of write strategies generated in the optical recording device in second and third embodiments of this invention when the optical disk is a medium of the phase change type.

FIG. 15 shows examples of write strategies generated in the laser waveform controller 240 in the optical recording device 100 shown in FIG. 13 when the optical disk 160 is a medium of the phase change type. FIG. 15 (*a*) shows a channel clock with period T. FIG. 15 (*b*) shows recording data consisting of marks and spaces. FIG. 15 (*c*) shows the emitted optical pulse pattern of a write strategy for recording the recording data in FIG. 15 (b). In the emitted optical pulse pattern, the level changes between the recording power level, erasing power level, and reproducing power level, and the width of each pulse is defined as the period spent at the recording power level and reproducing power level.

The shortest mark has a length corresponding to 3T, while the longest mark has a length corresponding to 14T.

FIG. 15 (b) and FIG. 15 (c) assume a case in which the shortest mark is recorded, then the fourth-shortest mark is recorded.

As shown at the left in FIG. 15 (c), when the recorded data are the shortest mark, the write strategy consists of a leading pulse F having pulse width 1TF, one subsequent multi-pulse M, and one subsequent cooling pulse C at the reproducing power level.

As shown at the right in FIG. 15 (c), the write strategy for recording the fourth shortest mark consists of a leading pulse F having pulse width LTF, followed by four multi-pulses M, then a cooling pulse C at the reproducing power level.

The write strategy for recording the n-th shortest mark (4<n<10, having a length corresponding to ((n+2)T) consists of a leading pulse F having pulse width LTF, followed by n multi-pulses M, then a cooling pulse C at the reproducing power level.

The write strategy for recording the third-shortest mark (having a length corresponding to 5T) consists of a leading pulse F having pulse width LTF, followed by three multi-pulses M, then a cooling pulse C at the reproducing level.

The write strategy for recording the longest mark (having a length corresponding to 14T) consists of a leading pulse F having pulse width LTF, followed by twelve multi-pulses M, then a cooling pulse C at the reproducing level.

As shown, the marks from the third shortest mark to the longest mark have the same leading pulse width LTF.

The write strategy recording the second shortest mark consists of a leading pulse F having pulse width 2TF, followed by two multi-pulses M, then a cooling pulse C at the reproducing level.

The width of the multi-pulse M is the same in all of the cases above.

The width of the cooling pulse C is the same in all of the cases above.

In a medium of phase change type, it is also a general practice to optimize the recording power by performing trial writing before recording information.

First, trial writing is performed on the optical disk 160 by use of a test pattern comprising 3T-11T marks and spaces corresponding to random recording data, for example, under varied recording power; next, the area on the optical disk 160 on which this test pattern has been recorded is reproduced, and the optimal recording power is obtained by comparing the modulation degree detected by the modulation degree detector 260 with a target value.

In general, the higher the recording power, the higher the modulation degree, and the lower the recording power, the lower the modulation degree.

The central controller 250 compares the detected modulation degree values corresponding to a plurality of mutually differing recording powers with the target value, and sets the recording power that generated a detected value nearest to the target value as the optimal recording power.

Alternatively, the trial writing on the optical disk 160 may be performed at one recording power level, the data may be reproduced, the modulation degree may be detected from the reproduced data, the detected demodulation degree may be compared with the target demodulation degree, and the recording power may be increased or decreased responsive to the comparison result to find the optimal value.

Within this basic information recording method, in the present invention, the power ratio in the write strategy for recording and the recording conditions such as the target value for adjusting the optimal power are obtained by calculations based on the recommended write strategy parameters and the recommended recording conditions recorded on the optical disk 160 and the characteristics of the optical system of the optical pickup of the optical recording device used in recording; then the calculated power ratio and the target value for adjusting the power are used in recording.

Figure 16:
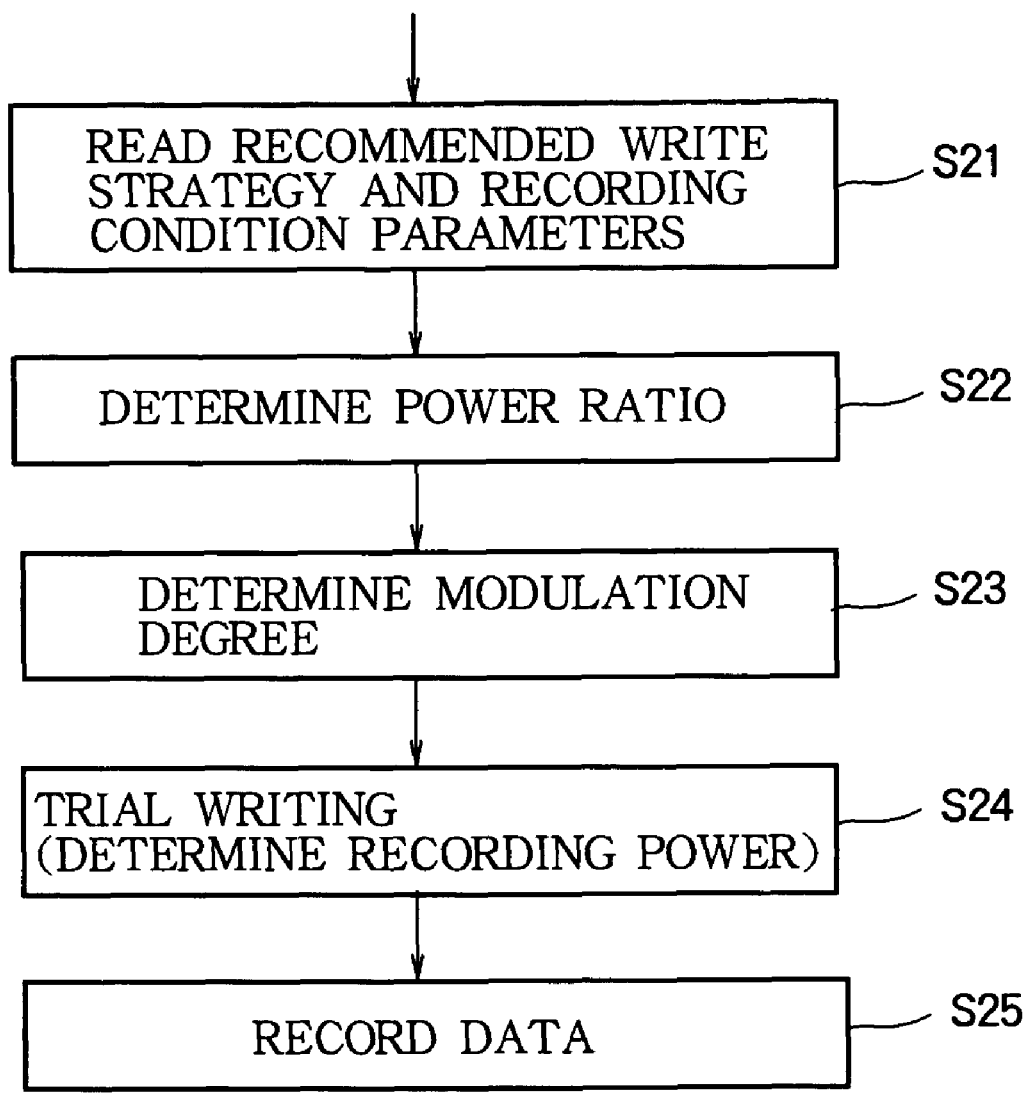
FIG. 16 is a flowchart illustrating the recording procedure in the optical recording device in the second and third embodiments of this invention.

Next, the procedure for the optical recording method of this embodiment will be described with reference to FIG. 16.

First, when the optical disk to be used in recording is inserted in the optical recording device, in step S21, the recommended write strategy parameters and recommended recording conditions, i.e., the recommended values iTP (i=1, 2, 3, L) of the leading pulse width in the write strategy for recording each mark, the recommended value TMP1 of the multi-pulse width, the recommended power ratio value ∈P1 (the value defined by the erasing power/the recording power), and the recommended recording power value PW1 are read (step S21).

The recommended write strategy parameters include the recommended value of the leading pulse width in the write strategy for recording each mark. As the recommended values iTP of the leading pulse width, at least the recommended pulse width 1TP of the leading pulse F for recording the shortest mark is read.

Next, in step S22, the power ratio value ∈P1 to be used in recording is determined based on the recommended write strategy parameters that were read in step S21 as described above (step S22).

$$\epsilon 1 = KE1 \times (PW1 \times \epsilon P1 \times TMP1) + CE1 \tag{7}$$

Data representing constants KE1 and CE1 are stored in the non-volatile memory in the central controller 250, and these data are read and used for the calculation according to equation (7).

Next, in step S23, the modulation degree MOD1 to be used in recording is determined based on the recommended write strategy parameters that were read in step S21 as described above (step S23).

$$MOD\ 1 = K\ MOD\ 1 \times (TMP1 \times TCP1/1TP1) + C\ MOD\ 1 \tag{8}$$

Data representing constants KMOD1 and CMOD1 are stored in the non-volatile memory in the central controller 250, and these data are read and used for the calculation in equation (8).

Next, when a recording command is received, trial writing on the optical recording medium is performed in step S24, using the power ratio and modulation degree values obtained as above. The write strategy determined in step S22 is set in the laser waveform controller 240, which in turn generates write strategies based on the test pattern to perform trial writing to the optical disk 160. At this time, the modulation degree MOD1 obtained as above is used as a target value. That is, the optimal recording power is determined by reproducing the area on the optical disk 160 on which the test pattern has been recorded, comparing the modulation degree detected by the modulation degree detector 220 with the modulation degree MOD1 calculated in step S23, and performing control to make the two values match.

Then, after this trial writing has been performed and the power has been adjusted, the adjusted recording power and the power ratio obtained in step S22 are used in step S25 to record data. That is, the power ratio determined in step S22 is set in the laser waveform controller 240, which in turn generates write strategies based on the recording data, and performs writing onto the optical disk 160 with the recording power determined in step S24.

As described above, in step S22, the power ratio value to be used in recording is determined based on the recommended pulse width value, the recommended recording power value, and the recommended power ratio value in the write strategy that have been read from the optical disk. In other words, the recommended power ratio value is not used as is, but is modified. The reason is as follows.

The recommended power ratio value, etc. are recorded in a predetermined areas on the optical disk as described above, but when the numerical aperture NA1 of the objective lens 150 in the recording conditions under which the recommended power ratio value was recorded on the optical disk 160 differs from the numerical aperture NA2 of the objective lens 150 of the optical recording device 100 used in recording, if the power is determined by using the recorded recommended power ratio value, the amount of heat supplied to the optical disk 160 differs due to the difference in the numerical aperture. Therefore, the size and shape of the pits formed corresponding to each mark length are other than optimal, and jitter is worsened. The power ratio is therefore modified or optimized to compensate for the difference in recording conditions, particularly for the difference in numerical apertures.

Next, the optimization of the power ratio will be described. It would be preferable if the optimization correction could be performed by a mathematical equation, but it was not clear what equation to use.

Therefore, the inventors conducted a variety of experiments to find conditions with minimum reproducing jitter, when the recording conditions of the optical recording device used in recording differed from the recording conditions used in determining the recommended write strategy parameters.

Figure 17:
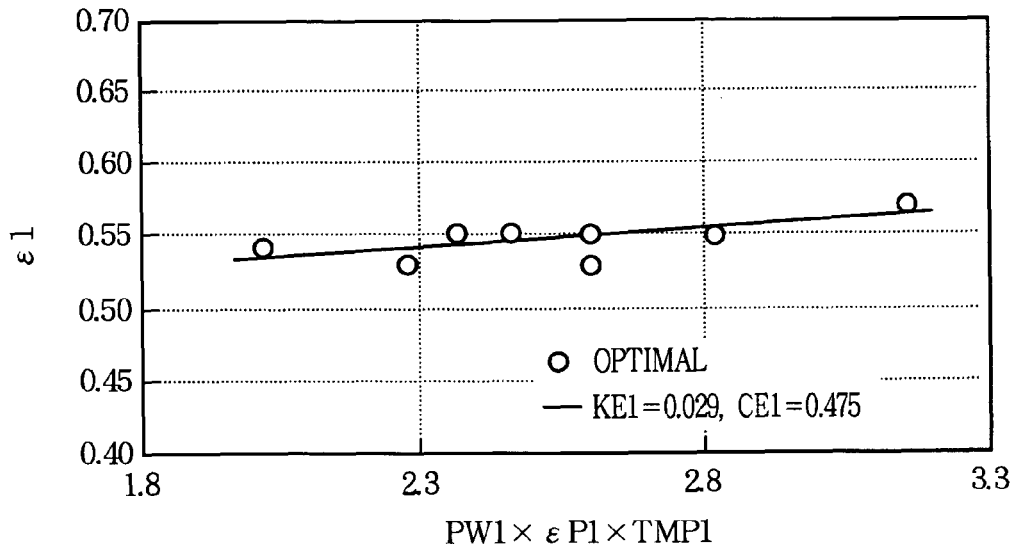
FIG. 17 illustrates the relationship between the recommended write strategy value PW1×∈P1×TMP1 and the power ratio ∈1 in the optical recording device in the second embodiment of this invention.

FIG. 17 shows circles representing the values of the power ratio $\epsilon P1$ with minimum reproducing jitter in an optical recording device 100 for a plurality of optical disks with different values of the recommended power ratio $\epsilon P1$, and a line indicating the power ratio $\epsilon 1$ obtained when KL1=0.029 and CE1=0.475 in equation (7). As shown in FIG. 17, it was found that the power ratio value (optimal power ratio value) with minimum reproducing jitter could be linearly approximated by using equation (7).

As described above, it was found that for a certain optical recording device, good results are obtained if the values of constants KE1 and CE1 are set as above.

The constants are not limited to the above values, however; it is thought that satisfactory results are obtainable if KE1 is set to a value near 0.03 and CE1 is set to a value near 0.48.

Next, the calculation of the modulation degree will be described.

The recommended value of the modulation degree is not recorded on the optical disk 160, so it has to be estimated from the value of the recommended pulse width.

Figure 18:
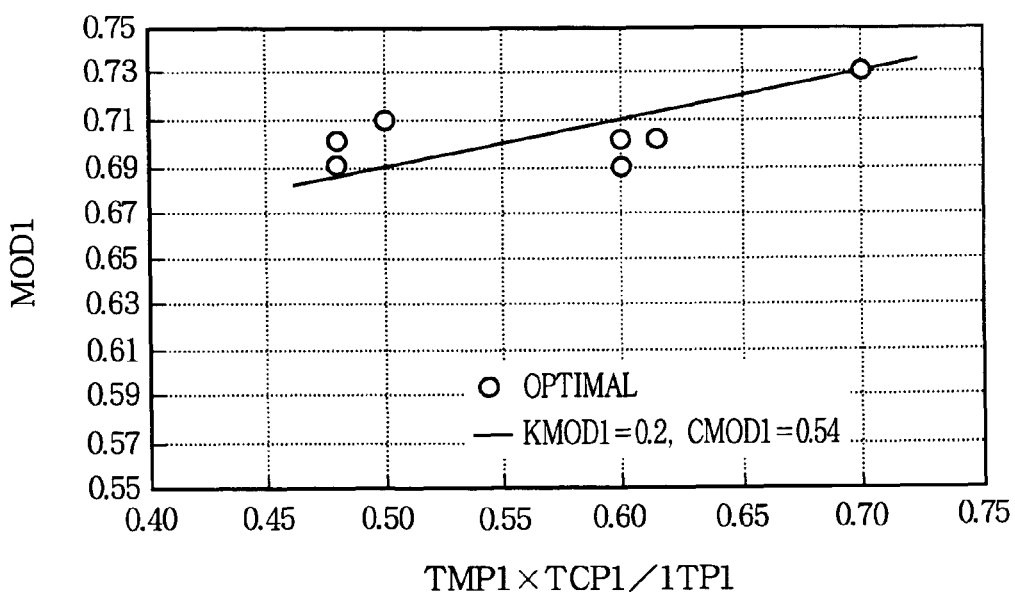
FIG. 18 illustrates the relationship between the recommended write strategy value TMP1×TCP1/1TP1 and the modulation degree MOD1 used for recording in the optical recording device in the second embodiment.

FIG. 18 shows circles representing the value of the modulation degree MOD1 with minimum reproducing jitter in various optical disks on a certain optical recording disk 100, and a line indicating the value of the modulation degree MOD1 obtained when KMOD1=0.2 and CMOD1=0.59 in equation (8). As shown in FIG. 18, it was found that the modulation degree (the optimal modulation degree value) with minimum reproducing jitter could be linearly approximated using equation (8).

As described above, it was found that for a certain optical recording device, good results are obtained if the values of constants KMOD1 and CMOD1 are set as above.

The constants are not limited to the above values, however; it is thought that satisfactory results are obtainable if KMOD1 is set to a value near 0.2 and CMOD1 is set to a value near 0.6.

Figure 19:
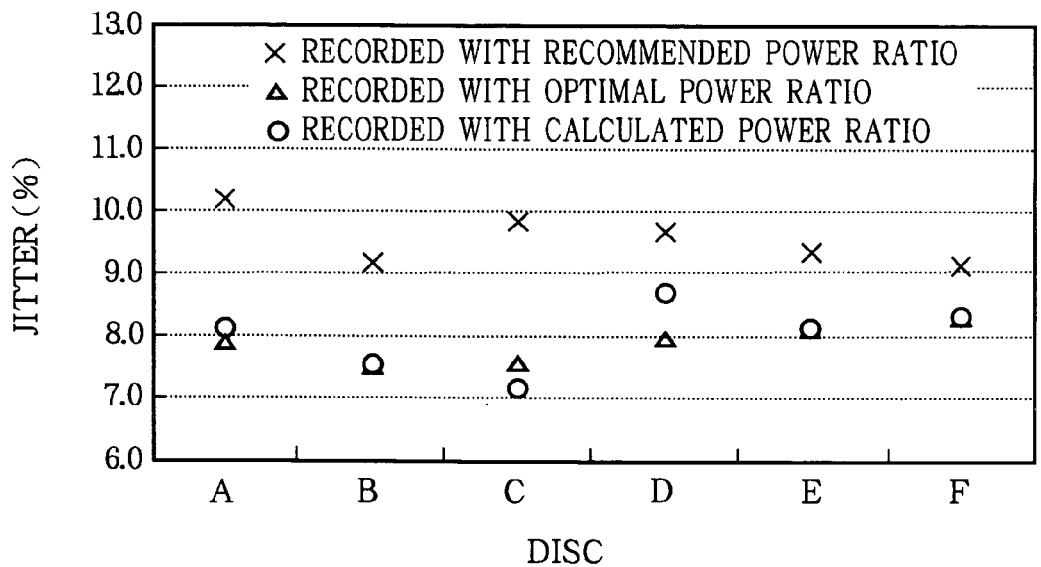
FIG. 19 illustrates the relationship between jitter value and the power ratio used in recording in the optical recording device in the second embodiment of this invention.

FIG. 19 shows reproducing jitter when three power ratios were used for recording on each of six types of optical disks A to F.

The X marks in FIG. 19 indicate the reproducing jitter when recording was performed using the recommended power ratio value recorded on each optical disk.

The triangular marks indicate the reproducing jitter when recording was performed using the optimized power ratio adjusted so as to obtain optimal reproducing jitter for each optical disk.

The circles indicate the reproducing jitter when recording was performed using the power ratio modified according to the above equation (7).

The constants in equation (7) in this case were set as follows: KE1=0.029, CE1=0.475.

In FIG. 19, better reproducing jitter could be obtained on all the disks when recording was performed using the modified recommended power ratio value (as indicated by the circles) than when recording was performed using the recommended power ratio value recorded on each optical disk (as indicated by the X's). When recording was performed using the modified recommended power ratio (as indicated by the circles), it was possible to obtain nearly the same good reproducing jitter as when recording was performed using the optimal power ratio (as indicated by the triangles).

Thus according to the present embodiment, recording can be performed using optimal power ratios and modulation degrees responsive to the characteristics of the optical system of the optical pickup of the optical recording device.

For example, the optical system conditions such as the numerical aperture, wavelengths, etc. used in determining the recommended parameters recorded on an optical recording medium generally differ from the optical conditions of commercially available optical recording devices, but by taking account of the differences between the specifications of a commercially available optical recording device, particularly the specifications of the optical system of its optical pickup, and the specifications of the optical system used in determining the recommended parameters, it is possible to determine the power ratio and modulation degree suitable for each optical recording device, and to perform recording under recording conditions suitable for each optical recording device.

The power ratio and modulation degree suitable for each recording device can be calculated easily if attention is paid to the differences between optical recording devices, particularly differences in the characteristics of the optical systems of their optical pickups, more particularly optical system differences including the numerical apertures of their objective lenses, by experimentally determining the constants (KE1, CE1, KMOD1, CMOD1) of the equations used to determine the power ratio and modulation degree, storing these constants in the optical recording device, in a non-volatile memory in the central controller, for example, and reading out and using these stored constants when recordings are made.

The constants only need to be determined once for each type of optical recording device or set of specifications; the same constants can be applied to other optical recording devices of the same type or with the same specifications. Once constants have been determined for an optical recording device of a certain type or with certain specifications, other optical recording devices of the same type or with the same specifications can be shipped with the constants that have been determined set therein.

When the type or specifications of the optical recording device 100 are changed, the recording conditions can be optimized easily by selecting or determining the constants (KE1, CE1, KMOD1, CMOD1) in equations (7) and (8) again.

In the optical recording method according to the second embodiment, because the power ratio and modulation degree used in recording are calculated using the recommended pulse width values in the recommended write strategy parameters recorded on the optical disk 160, the recommended power ratio value, the recommended recording power value, and equations (7) and (8), it is possible to support recording by any recording device on any recording medium without the need to store a large amount of strategy information.

Recording can furthermore be performed better than when the recommended power ratio values are used without modification, and nearly as well as when the optimal recommended optimal power ratio value for each optical disk are used. Good recording accordingly can be performed on an optical disk for which the optimal power ratio is not known beforehand.

In equation (8), the recommended leading pulse width value of the strategy pulse for recording the shortest mark is used, but the recommended leading pulse width value of the strategy pulse for recording the second-shortest mark or the recommended leading pulse width value of the strategy pulse for recording the third-shortest mark to the longest mark may be used instead.

Third Embodiment

The second embodiment above describes a recording method for use when the optical disk 160 is a recording medium of the phase change type and recording is carried out at the standard recording speed. A recording method for use when the optical disk 160 is a recording medium of the phase change type and recording is carried out at double speed will be described below.

Double-speed recording uses the same write strategy as in recording at the standard speed.

In this embodiment, the power ratio in the write strategy for recording and the target value for adjusting the optimal power in the recording conditions are determined by calculations based on the recommended write strategy parameters and the recommended recording conditions that have been recorded on the optical disk 160 and the characteristics of the optical system of the optical pickup of the optical recording device to be used in recording, and recording is carried out by use of the determined power ratio and the target value for adjusting the power. The optical recording device used in this embodiment is the same as in FIG. 13.

Next, the procedure followed in the optical recording method of this embodiment will be described with reference to FIG. 16.

First, when the optical disk to be used in recording is inserted in the optical recording device, in step S21, the recommended write strategy parameters for carrying out double-speed recording, i.e., the recommended values iTP2 (i=1, 2, 3, L) of the leading pulse width in the write strategy for recording each mark, the recommended power ratio value εP2 (the value defined as erasing power/recording power), and the recommended recording power PW2 are read from the optical recording medium (step S21).

The recommended write strategy parameters include the recommended value of the leading pulse width in the write strategy for recording each mark. As the recommended values iTP2 of the leading pulse width, at least the recommended pulse width 1TP2 of the leading pulse F for recording the shortest mark is read.

Next, in step S22, the power ratio value ε2 to be used in recording is determined based on the recommended write strategy parameters that were read in step S22 as described above (step S22).

$$\varepsilon 2 = KE2 \times ((PW2\char`\^2) \times \varepsilon P2/1TP2) + CE2 \quad (9)$$

Data representing constants KE2 and CE2 are stored in the non-volatile memory in the central controller 250; these are read and used for the calculation according to equation (9).

Next, in step S23, the modulation degree MOD2 to be used in recording is calculated, based on the recommended write strategy parameters that were read in step S21 as described above according to the following equation (10) (step S23).

$$MOD\,2 = K\,MOD\,2 \times (1TP2 \times PW2)\char`\^2 + K\,MOD\,3 \times (1TP2 \times PW2) + C\,MOD\,2 \quad (10)$$

Data representing constants KMOD2, KMOD3, CMOD2 are stored in the non-volatile memory in the central controller 250; these are read and used for the calculation according to equation (10).

Next, when a recording command is received, trial writing on the optical recording medium is performed in step S24, using the power ratio and modulation degree values obtained as above. That is, the power ratio determined in step S22 is set in the laser waveform controller 240, which in turn generates write strategies based on a test pattern to perform trial writing to the optical disk 160. The modulation degree MOD2 obtained as above is used as a target value. That is, the optimal recording power is determined by reproducing the area on the optical disk 160 on which the test pattern has been recorded, comparing the modulation degree detected by the modulation degree detector 260 with the modulation degree MOD2 calculated in step S23, and performing control to make the two values match.

After this trial writing has been performed and the power has been adjusted, the adjusted recording power and the power ratio obtained in step S22 are used in step S25 to record data. That is, the power ratio determined in step S22 is set in the laser waveform controller 240, which in turn, generates write strategies based on the recording data, and performs writing onto the optical disk 160 with the recording power determined in step S24.

Next, the optimization of the power ratio will be described. It would be preferable if the optimization correction could be performed by a mathematical equation, but it was not clear what equation to use.

Therefore, the inventors conducted a variety of experiments to find conditions with minimum reproducing jitter, when the recording conditions of the optical recording device used in recording differ from the recording conditions used in determining the recommended write strategy parameters.

Figure 20:
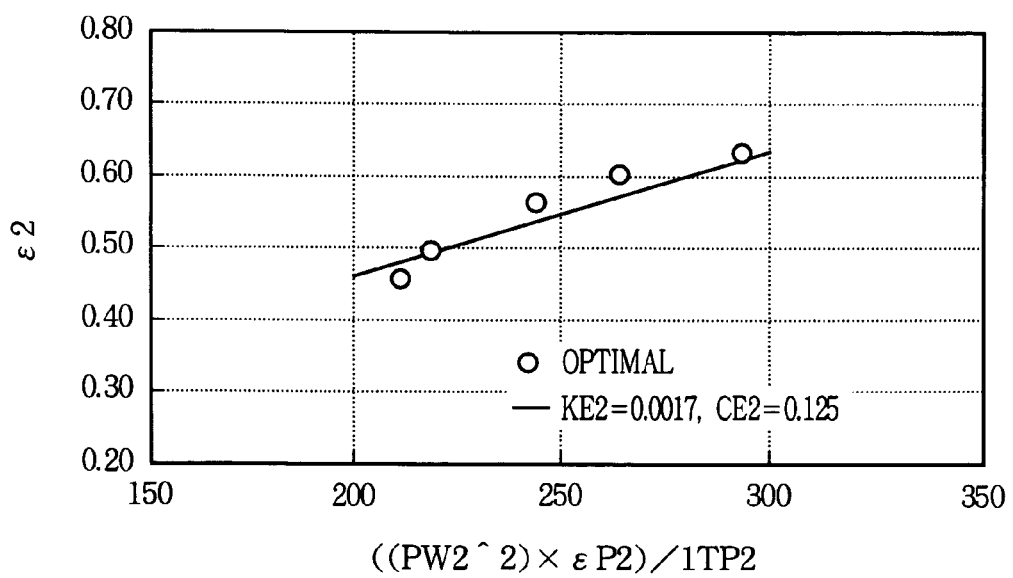
FIG. 20 illustrates the relationship between the recommended recording condition value (PW2^×∈P2)/1TP1 recorded on the optical disk and the power ratio ∈2 in the optical recording device in the third embodiment.

The circles in FIG. 20 indicate the values of the power ratio value ε2 that minimize the reproducing jitter in a certain optical recording device 100 for a plurality of optical disks having different recommended power ratio values εP2, and the straight line indicates the power ratio value ε2 obtained from equation (9) with KE2=0.0017, and CE2=0.125. As shown in FIG. 20, it was found that the power ratio values (optimal power ratio values) that minimize the reproducing jitter could be linearly approximated by use of equation (9).

As described above, it was found that for a certain optical recording device, good results are obtained if the values of constants KE2 and CE2 are set as above.

The constants are not limited to the above values however; it is thought that satisfactory results are obtainable if KE2 is set to a value near 0.002 and CE2 is set to a value near 0.13.

Next, the calculation of the modulation degree will be described.

Since the recommended value of the modulation degree is not recorded in the optical disk 160, it is necessary to estimate its value from the recommended pulse width value.

Figure 21:
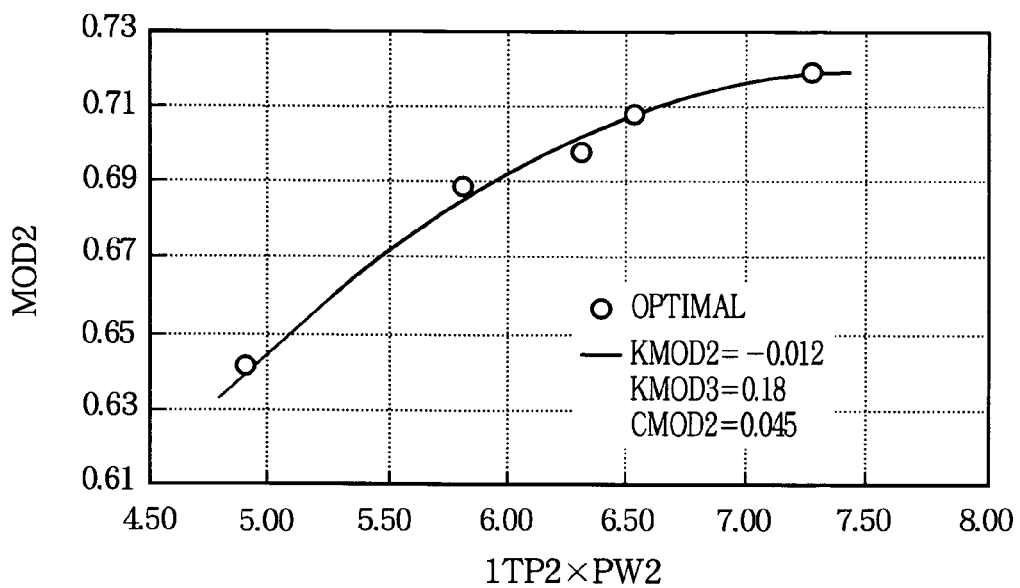
FIG. 21 illustrates the relationship between the recommended recording condition value 1TP2×PW2 recorded on the optical disk and the modulation degree MOD2 used in recording in the optical recording device in the third embodiment of this invention.

The circles in FIG. 21 indicate the values of the modulation degree MOD2 that minimize the reproducing jitter in a certain optical recording device 100, and the curve indicates the modulation degree MOD2 obtained from equation (10) with KMOD2=−0.01, KMOD3=0.18, and CMOD2=0.045. As shown in FIG. 21, it was found that the modulation degree (optimal modulation degree value) that minimizes the reproducing jitter could be quadratically approximated by use of equation (10).

As described above, it was found that for a certain optical recording device, good results are obtained if the values of constants KMOD2, KMOD3, and CMOD2 are set as above.

The constants are not limited to the above values, however; it is thought that satisfactory results are obtainable if KMOD2 is set to a value near −0.01, KMOD3 to a value near 0.2, and CMOD2 to a value near 0.05.

Figure 22:
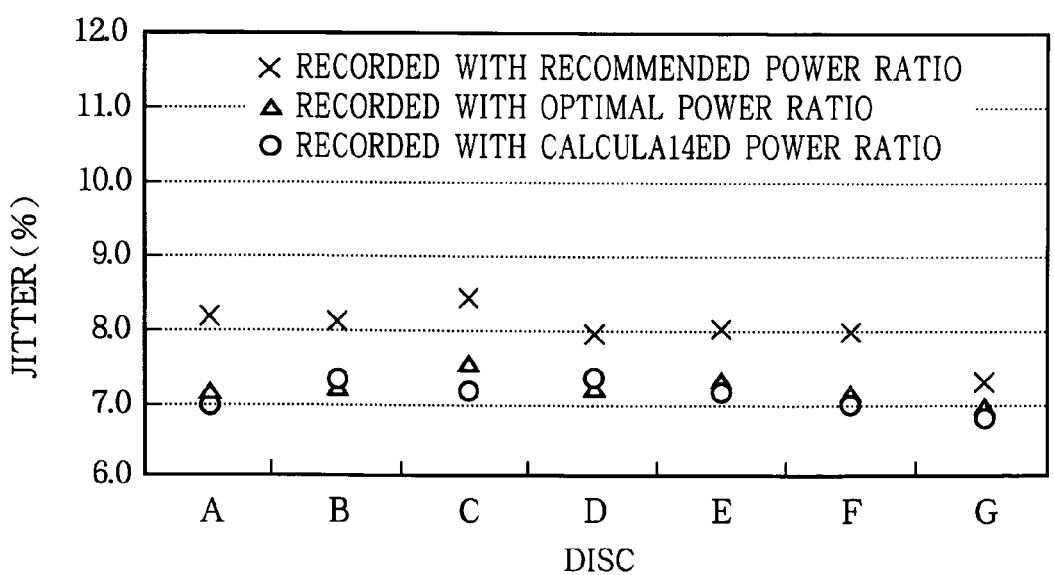
FIG. 22 illustrates the relationship between jitter value and the power ratio used in recording in the optical recording device in the third embodiment of this invention.

FIG. 22 shows reproducing jitter when three power ratios were used for recording on each of seven types of optical disks A to G.

The X marks in FIG. 22 indicate the reproducing jitter when recording was performed using the recommended power ratio values recorded on each optical disk.

The triangular marks indicate the reproducing jitter when recording was performed using the optimized power ratios adjusted so as to obtain optimal reproducing jitter for each optical disk.

The circles indicate the reproducing jitter when recording was performed using the power ratio modified according to the above equation (9).

The constants in equation (9) in this case were set as follows: KE2=0.0017, CE2=0.125.

In FIG. 22, better reproducing jitter could be obtained on all the disks when recording was performed using the modified recommended power ratio values (as indicated by the circles) than when recording was performed using the recommended power ratio values recorded on each optical disk (as indicated by the X's). When recording was performed using the modified power ratio values (as indicated by the circles), it was possible to obtain nearly the same good reproducing jitter as when recording was performed using the optimal power ratios (as indicated by the triangles).

Thus according to the present embodiment, recording can be performed using optimal power ratio and modulation degree values responsive to the characteristics of the optical system of the optical pickup of the optical recording device.

For example, the optical system conditions such as the numerical aperture etc. used in determining the recommended parameters recorded on an optical recording medium generally differ from the optical conditions of commercially available optical recording devices, but by taking account of the differences between the specifications of a commercially available optical recording device, particularly the specifications of the optical system of its optical pickup, and the specifications of the optical system used in determining the recommended parameters, it is possible to determine power ratios and modulation degrees suitable for each optical recording device, and to perform recording with write strategies best suitable for each optical recording device.

The power ratios and modulation degrees suitable for each recording device can be calculated easily if attention is paid to the differences between optical recording devices, particularly differences in the characteristics of the optical systems of their optical pickups, more particularly optical system differences including the numerical apertures of their objective lenses, by experimentally determining the constants (KE2, CE2, KMOD2, KMOD3, CMOD2) of the equations used to determine the power ratios and modulation degrees, storing these constants in the optical recording device, in a non-volatile memory in the central controller, for example, and reading out and using these stored constants when recordings are made.

The constants only need to be determined once for each type of optical recording device or set of specifications; the same constants can be applied to other optical recording devices of the same type or with the same specifications. Once constants have been determined for an optical recording device of a certain type or with certain specifications, other optical recording devices of the same type or with the same specifications can be shipped with the constants that have been determined set therein.

When the specifications of the optical recording device 100 are changed, the recording conditions can be optimized easily by selecting or determining the constants (KE2, CE2, KMOD2, KMOD3, CMOD2) in equations (9) and (10) again.

In the optical recording method according to the third embodiment, because the power ratio and modulation degree values used in recording are calculated according to equations (9) and (10), using the recommended power ratio value in the recommended write strategy parameters recorded on the optical disk 160, recordings can be made by any recording device on any recording medium without the need to store a large amount of strategy information.

Recording can furthermore be performed better than when the recommended write strategy parameters and recommended asymmetry value are used without modification, and nearly as well as when the optimal recommended optimal write strategy parameters for each optical disk are used. Good recording accordingly can be performed on an optical disk for which the optimal write strategy information is not known beforehand.

In equations (9) and (10), the recommended leading pulse value of the strategy pulse for recording the shortest mark is used, but the recommended leading pulse width in the write strategy for recording the second-shortest mark or the recommended leading pulse width in the write strategy for recording a mark from the third-shortest mark to the longest mark may be used instead.

Although the pulse widths are not adjusted (the recommended pulse width values are not modified) in the second and third embodiments above, these embodiments may be adapted to adjust the pulse widths.

What is claimed is:

1. An optical recording method comprising the steps of:
    reading recommended multi-pulse write strategy parameters from a dye-type optical recording medium on which the recommended multi-pulse write strategy parameters have been recorded;
    determining leading pulse widths of a write strategy used for recording each mark based on a recommended leading pulse width for recording an i-th shortest mark included in the multi-pulse write strategy parameters that were read, characteristics of an optical system of an optical pickup of an optical recording device used in recording, and a predetermined calculation formula for determining the leading pulse width;

determining a multi-pulse width of the write strategy used for recording based on some of the recommended leading pulse widths for recording each mark and a recommended multi-pulse width included in the multi-pulse write strategy parameters that were read, the characteristics of the optical system of the optical pickup, and a predetermined calculation formula for determining the multi-pulse width; and writing to the optical recording medium by use of the optical recording device, using the write strategy thus determined, wherein, the steps of determining are carried out by computations using the formulas predetermined for the optical recording device used in recording, in regard to the write strategy for recording each mark, a leading pulse width and a multi-pulse width that minimize reproducing jitter are determined experimentally, the formulas are generated such that the experimentally determined leading pulse width and multi-pulse width are the results of calculations or values approximating the results of the calculations, the generated formulas are used in said steps of determining, and the formula for determining the leading pulse width in the write strategy is expressed as $$iTF=Ki \times iTP+Ci$$

(where iTF is the pulse width of the leading pulse in the write strategy used for recording an i-th shortest mark, iTP is the pulse width of the leading pulse in the recommended write strategy parameters for recording the i-th shortest mark, and Ki and Ci are constants for determining the write strategy to be used to record the i-th shortest mark).

2. The optical recording method of claim 1, wherein:

the step of determining the leading pulse width in the write strategy uses the leading pulse width in the write strategy used for recording the second-shortest mark, as calculated by the formula for determining the leading pulse width in the write strategy, as the leading pulse width 1TF in the write strategy used for recording the shortest mark.

3. The optical recording method of claim 1, wherein:

the step of determining the leading pulse width in the write strategy uses the leading pulse width in the write strategy used for recording the fourth-shortest mark, as calculated by the formula for determining the leading pulse width in the write strategy, as the leading pulse width 3TF in the write strategy used for recording the third-shortest mark.

4. The optical recording method of claim 1, wherein the leading pulse width in the write strategy used for recording the fourth-shortest mark is used in all write strategies from the write strategy used for recording the fifth-shortest mark to the write strategy used for recording the longest mark.

5. An optical recording method comprising the steps of:

reading recommended multi-pulse write strategy parameters from a dye-type optical recording medium on which the recommended multi-pulse write strategy parameters have been recorded;

determining leading pulse widths of a write strategy used for recording each mark based on a recommended leading pulse width for recording an i-th shortest mark included in the multi-pulse write strategy parameters that were read, characteristics of an optical system of an optical pickup of an optical recording device used in recording, and a predetermined calculation formula for determining the leading pulse width;

determining a multi-pulse width of the write strategy used for recording based on some of the recommended leading pulse widths for recording each mark and a recommended multi-pulse width included in the multi-pulse write strategy parameters that were read, the characteristics of the optical system of the optical pickup, and a predetermined calculation formula for determining the multi-pulse width; and writing to the optical recording medium by use of the optical recording device, using the write strategy thus determined, wherein, the steps of determining are carried out by computations using the formulas predetermined for the optical recording device used in recording, in regard to the write strategy for recording each mark, a leading pulse width and a multi-pulse width that minimize reproducing jitter are determined experimentally, the formulas are generated such that the experimentally determined leading pulse width and multi-pulse width are the results of calculations or values approximating the results of the calculations, the generated formulas are used in said steps of determining, and the formula for determining the multi-pulse width in the write strategy is expressed as $$TM=KM \times (TMP \times 2TP \times LTP/1TP)+CM$$

(where TM is the multi-pulse width in the write strategy used for recording,

TMP is the multi-pulse width in the recommended write strategy parameters,

2TP is the pulse width of the leading pulse in the recommended write strategy parameters for recording the second-shortest mark, LTP is the pulse width of the leading pulse in the recommended write strategy parameters for recording the fourth-shortest mark to the longest mark, 1TP1 is the leading pulse width in the recommended write strategy parameters for recording the shortest mark, and KM and CM are constants for determining the write strategy to be used to record the shortest mark).

* * * * *